2,629,610

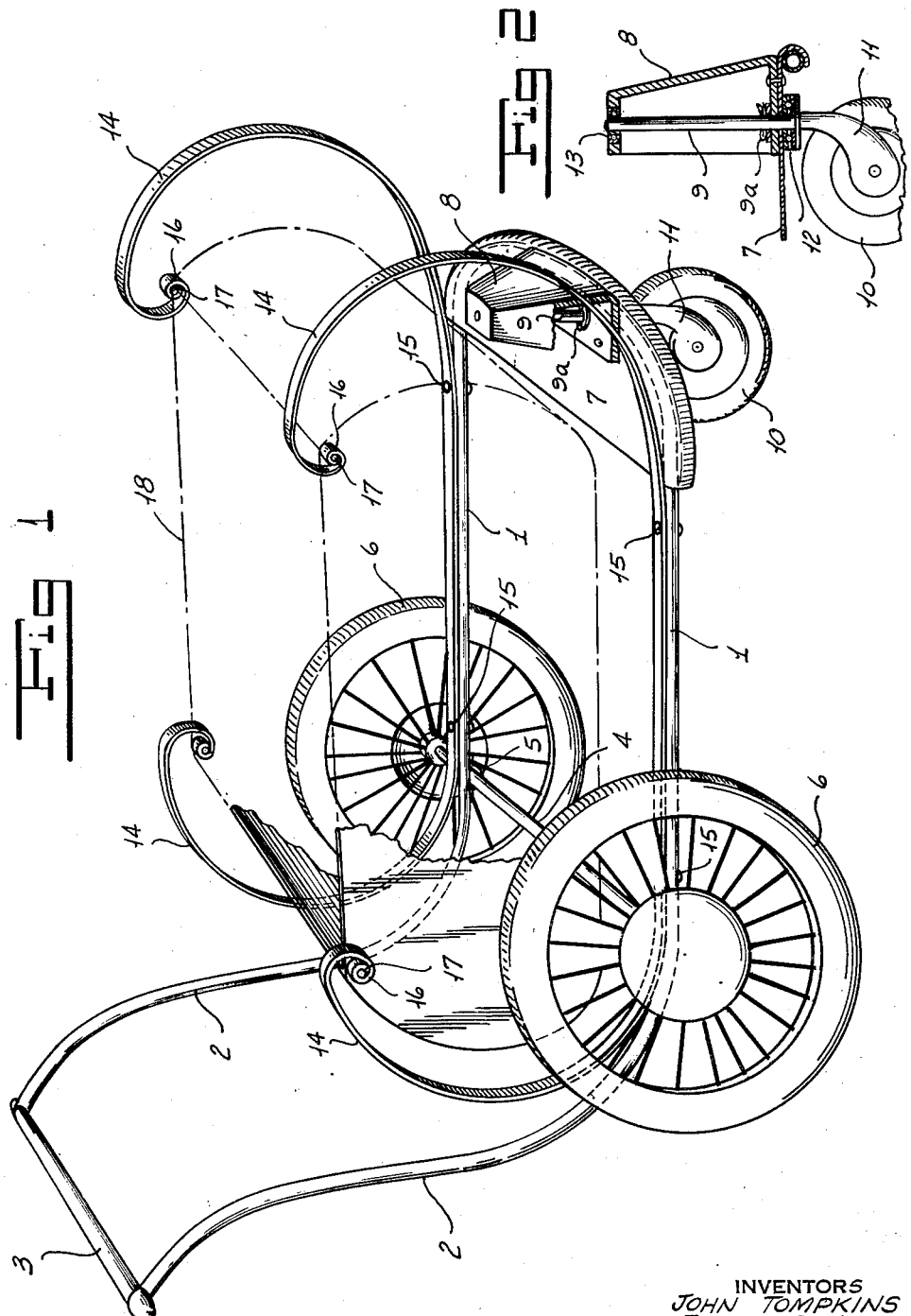
Feb. 24, 1953 — E. B. LIED ET AL — 2,629,610
FOUR-POINT LEAF SPRING SUSPENSION FOR BABY CARRIAGES
Filed July 19, 1950
INVENTORS
JOHN TOMPKINS
EDGAR B. LIED
ATTORNEY Patented Feb. 24, 1953

UNITED STATES PATENT OFFICE 2,629,610

FOUR-POINT LEAF SPRING SUSPENSION FOR BABY CARRIAGES

Edgar B. Lied and John Tompkins, Elizabeth, N. J.; said Lied assignor to said Tompkins Application July 19, 1950, Serial No. 174,632

2 Claims. (Cl. 280—47)

This invention is a baby carriage and the object of the invention is to provide a carriage which will ride the occupant more comfortably than heretofore, without shocks, jars or undesirable vibration and which may be manipulated along a given path in a more simple and efficient manner than has heretofore been the case with conventional baby carriages.

Baby carriages, as now constructed, are generally provided with front and rear two-wheeled axles above which the body of the carriage is supported by relatively short springs connected to the under side of the body and to the axles. These springs are made relatively light in order to properly support a relatively light and young baby without too much jar and vibration and when so constructed, they do not satisfactorily support a much heavier child. Furthermore, with a four wheel carriage, it is necessary to tilt the forward end of the carriage upwardly to lift the front wheels off the ground when it is desired to make a turn or change in direction. The carriage of the present invention eliminates these disadvantages and others by providing a spring suspension which will properly support children of widely different weights and ages in a thoroughly efficient manner and without undue jar or vibration and which is so constructed that the carriage may change direction of movement either forwardly, backwardly or pivotally without lifting any wheel from the ground.

In its preferred practical form the carriage of the present invention comprises a chassis frame which may be conveniently made of metal tubing bent into an appropriate shape as hereinafter described. The rear of the chassis frame is supported upon a single transverse axle having appropriate wheels at its opposite ends while the front end of the chassis is supported on a single wheel located midway of the width of the chassis frame. This front wheel is smaller than the rear wheels and is adapted to swivel on a vertical axis as may be necessary to permit the carriage to negotiate turns. The body of the carriage is supported above the chassis frame on relatively long leaf springs secured intermediate their ends to the chassis frame, with their ends bowed upwardly and toward one another and secured to the four corners of the body near the upper edge of the latter so that the body is suspended from near its upper edge upon these long bowed springs. The body is thereby hung from these springs in such manner that the center of weight of the body and its occupant is very materially below the points of attachment of the springs to the body. This arrangement affords maximum stability, while the long springs assure easy riding over a wide range of weight of the occupant. The child is supported in the carriage of this invention in such manner that the carriage may move over relatively rough sidewalks or other surfaces without transmitting shocks or jars to the child for the body will partake of what we term a "gliding movement" under all conditions.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

Figure 1 is a perspective view showing a carriage embodying the present invention, portions of the body being broken away and shown in phantom in the interest of clearness.

Figure 2 is a longitudinal vertical section through the front wheel and its swivel mounting.

Referring to the drawings, 1 designates a chassis frame which, in practice, is preferably made of metal tubing bent into substantially U-shape to form a horizontal platform with a semi-circular front end, the tubing being bent upwardly at the rear to form handle brackets 2 connected by a hand grip 3.

Extending transversely under the rear portion of the frame is a rear axle 4 which may be secured to the frame by fittings 5 or in any other suitable manner to permit the opposite ends of the axle to extend beyond the lateral edges of the frame and be equipped with appropriate wheels 6. These wheels are preferably fairly large so as to permit them to move smoothly over uneven surfaces.

Across the forward end of the frame extends a wheel supporting plate 7. This plate may conveniently be made by stamping out a blank of sheet metal of semicircular form, then resting said plate upon the upper surface of the chassis frame and thereupon bending the arcuate peripheral margin of said plate about the tubing of which said frame is formed so as to thereby attach the plate to the forward end of the chassis frame as shown best in Figure 2. The plate may also be welded to the frame to render it permanently rigid therewith.

Superimposed upon the plate 7 is a bracket 8 adapted to support a spindle 9 of a swivel wheel 10. This spindle is provided at its lower end with a yoke 11 in which the wheel 10 is mounted to rotate and said spindle is provided with an anti-friction thrust bearing 12 and an anti-friction bearing 13, as shown in Figure 2, to permit the wheel to swivel without undue friction. A cotter pin 9a holds the spindle in place. The wheel 10 is sufficiently small to permit it to underlie the chassis frame and when mounted as described, it is free to swivel upon the vertical axis of its spindle 9 which is arranged substantially medially of the width of the frame.

When a chassis frame is mounted on three wheels in the manner described, it may be moved along either a straight or curvilinear path without requiring the disengagement of any of these wheels from the ground and it may turn corners as readily as along a straight path. Futhermore, it may be moved in either a forward or rearward direction with ease and facility. The slightest lateral pressure upon the handle will control the direction of movement.

Mounted upon the side reaches of the chassis frame are a pair of leaf springs 15. These springs are long and flexible. They are secured intermediate their ends to the frame by rivets 15 or by welding or both, so that said springs occupy upstanding parallel relation to one another. Beyond their points of attachment to the frame, their opposite ends sweep upwardly on long flowing curves and thence toward one another, so that their resilient opposite end portions may be said to be substantially semi-elliptical. Practically the entire semi-elliptical portions of these springs are adapted for free resilient operation, only the very ends of the springs being bent downwardly and closely curled as shown at 16 to engage with studs 17 rigidly mounted on the body 18. The studs 17 project laterally from the body 18 near the upper open top of the body so that practically the entire body is suspended below these four points of attachment to the springs, as clearly shown in Figure 1. The body is thus hung from its upper edge so that its weight and that of a child therein are well below the points of suspension. This fact provides stability and easy riding, particularly with the long bowed springs as shown. In fact the bowed resilient portions of these springs constitute by far the greater portion of the length of each spring, so as to obtain maximum resiliency. This permits the springs to be made fairly heavy and substantial and at the same time provide the necessary resiliency to properly support and cushion different weights.

An important feature of the present invention resides in the fact that the parts of the carriage of this invention may be economically manufactured and assembled so that the advantages of the present invention may be obtained without material addition to manufacturing costs over those of conventional baby carriage construction.

The body has been shown of one particular shape, although it will be understood that this shape may be varied without departing from this invention, the scope of which is to be understood as fully commensurate with the appended claims.

Having thus fully described the invention, what we claim as new and desire to secure by Letters Patent is:

1. A baby carriage comprising: a chassis frame of metal tubing returned upon itself with integral handle brackets extending upwardly from the rear end of the frame, said frame being provided across its rear portion with an axle having wheels at its opposite ends, a single swivel wheel medially attached beneath the forward end of said chassis frame, a body above the chassis frame, and leaf springs arranged in upstanding parallel relation at the opposite sides of the chassis frame and secured intermediate the ends of said springs to said frame, the opposite end portions of said springs being bowed in opposite directions and secured at their free terminal ends to the opposite sides of the body adjacent the upper open top of the latter to resiliently suspend the body above the chassis frame.

2. A baby carriage as claimed in claim 1, wherein the chassis frame is of substantially U-shaped tubular construction with the arcuate portion of the frame at the forward end thereof with the end portions of the metal tubing being bent upwardly and rearwardly to support a handle, and wherein the swivel wheel is supported on a wheel supporting plate secured across the front end of the chassis frame.

EDGAR B. LIED.
JOHN TOMPKINS.

REFERENCES CITED

The following references are of record in the file of this patent:

UNITED STATES PATENTS

| Number | Name | Date |
| --- | --- | --- |
| 140,593 | Shepard | July 8, 1873 |
| 417,109 | Speck | Dec. 10, 1889 |
| 1,157,224 | Hyde | Oct. 19, 1915 |
| 2,180,531 | Kroll et al. | Nov. 21, 1939 |
| 2,474,804 | Schwarzbaum | June 28, 1949 |